US008438200B2

(12) United States Patent
Jenson (10) Patent No.: US 8,438,200 B2
(45) Date of Patent: May 7, 2013

(54) SYSTEM AND METHOD FOR CALCULATING COORDINATE PAIRS FOR CONSTRUCTION OF ARCHES AND ARCHWAYS

(76) Inventor: Tim Jenson, Eagle Mountain, UT (US)

(*) Notice: Subject to any disclaimer, the term of this patent is extended or adjusted under 35 U.S.C. 154(b) by 1049 days.

(21) Appl. No.: 12/407,728

(22) Filed: Mar. 19, 2009

(65) Prior Publication Data

US 2009/0240752 A1  Sep. 24, 2009

Related U.S. Application Data

(60) Provisional application No. 61/037,811, filed on Mar. 19, 2008.

(51) Int. Cl.
*G06F 15/02* (2006.01)
*G01B 21/00* (2006.01)

(52) U.S. Cl.
USPC .......................................... 708/134; 708/131

(58) Field of Classification Search .................. 708/134, 708/131
See application file for complete search history.

(56) References Cited

U.S. PATENT DOCUMENTS

| 4,744,044 A * | 5/1988 | Stover et al. .................. 708/530 |
| 6,295,544 B1 * | 9/2001 | Cheung ......................... 708/134 |
| 6,873,942 B1 * | 3/2005 | Suga ................................. 703/1 |
| 7,765,712 B2 * | 8/2010 | Stockman ....................... 33/784 |
| 7,793,421 B2 * | 9/2010 | Hardy ............................. 33/194 |
| 2010/0182312 A1 * | 7/2010 | Mitani et al. .................. 345/419 |

* cited by examiner

*Primary Examiner* — Tammara Peyton (74) *Attorney, Agent, or Firm* — Rader, Fishman & Grauer, PLLC (57) ABSTRACT

A method for calculating coordinate points corresponding to a segment of a circle for arch construction includes entering a desired width dimension of a desired arch, entering a desired height dimension of a desired arch, and calculating coordinate pairs corresponding to a previously defined coordinate system, wherein the resultant coordinate pairs correspond to points defining an arc, wherein the arc is the arc corresponding to the width and height dimensions of the desired arch.

17 Claims, 9 Drawing Sheets

SYSTEM AND METHOD FOR CALCULATING COORDINATE PAIRS FOR CONSTRUCTION OF ARCHES AND ARCHWAYS

RELATED APPLICATIONS

The present application claims the benefit under 35 U.S.C §119(e) of U.S. Provisional Patent Application No. 61/037,811 filed Mar. 19, 2008 titled "DEVICE AND METHOD FOR CALCULATING COORDINATE PAIRS FOR CONSTRUCTION OF ARCHES AND ARCHWAYS," which application is incorporated herein by reference in its entirety.

FIELD

The present system and method relate to devices aiding in construction calculations. Particularly, the present system and method provide a computing device designed to aid in the construction of arches and archways.

BACKGROUND

Construction of arches has been an important and complicated area of construction throughout history. Currently it is common in both commercial and residential applications to construct arches and archways for both structural integrity as well aesthetic appeal. Arches may be used in a variety of applications throughout the construction process; examples include, doorways, windows, entryways, ceilings, decorative moldings, railings, and other desired locations. In some cases, arches are constructed to aid in support of the structure. That is, in many cases the arch must be structurally sound. In other applications, arches are added simply to provide a desired look.

Seeking structural integrity or decorative features, it is important that the builder construct the arch in such a way that the resulting arch is symmetric and as close to the desired size and shape as possible. Commonly, arches are designed to be a portion of the perimeter of a circle. An arch may include as much as a semi-circle, or as little as a few degrees of the perimeter of a much larger circle. A semi-circle includes 180 degrees of the perimeter while an arch including only a tenth of a degree may appear nearly flat to an observer.

The use of arches in building construction is well known. In both residential and commercial settings, arches or archways add significantly to the aesthetic beauty of the edifice. While arches are often desired for their aesthetic appeal, the construction process required for creating arched openings has traditionally been a difficult process, requiring a significant amount of time and energy from the builder. The resulting quality of the arch is dependant on the skill and experience of the builder. A typical process for constructing an arch includes a framer measuring and cutting support pieces for the desired arch. Often, in order to make multiple copies of an arch, or one arch to a high degree of accuracy, a framer may choose to use a string to draw out a portion of a circle on plywood. After drawing a portion of the perimeter of the circle, the framer has an accurate drawing for cutting. An arch may be described more accurately as a circular arch; that is because an arch or archway is actually a portion of the perimeter of a circle. Thus, a framer is able to define a center of a circle, secure one end of a string to the center of the circle. The string, being a defined length, now represents the radius of the circle, by dragging the free end of the string in a circle, keeping the string taught, a perfect portion of a circle may be drawn. For a small arch representing only a few degrees of the perimeter of the circle, a relatively short string may be used from a short distance away.

This method has obvious limitations. It is not uncommon for a framer to be required to build a large arch or an arch that represents only a few degrees of a circle with a radius of many tens of feet or even hundreds of feet. To use the traditional method on such an arch would require a string of enormous lengths as well as requiring a person to walk relatively long distances for each arch.

As a result, due to the skill and time required to produce highly accurate arches, many arches are constructed poorly. For example, the opening may not be true, it may be off-center, or it may be framed poorly requiring additional supports. The difficulties arising in arch construction are well known, and subsequently many attempts have been made to remedy the situation. Methods describing pre-manufactured arches as well as methods for constructing custom and semi-custom arches have been described. However, a need exists for a method that may be used by experienced and inexperienced builders to be able to quickly calculate the cuts necessary to construct accurate arches, especially when an arch may need to be constructed and exactly repeated multiple times, such as in window construction.

Construction calculators are fairly common and often used by builders in calculating various linear dimensions and areas during the building process. Many universal calculators exist. These typically allow a user to input certain characteristics of a problem and calculate amounts of material or dimensions necessary. An example is a construction calculator allowing a user to input a distance from one floor to the other, and a desired angle, the calculator will then tell the user the number of stairs and the length and height of each stair. Another example may be that of a unit converter; a user inputs measurements in feet and receives a converted number in meters, or a length, width, and height to receive a volume.

SUMMARY

According to one exemplary embodiment, a handheld device is configured to allow a user to perform various calculations relating to construction. Particularly, a function called Archpro is configured to enable a user to input a height, width, and the number of desired points, and is given as an output a number of points corresponding to points on an arc, enabling the user to construct an arch to the exact height and width desired.

According to one exemplary embodiment, a computing device configured to run the Archpro program is handheld and has input keys and an output display allowing a user to utilize various functions, including the Archpro described above. According to alternative exemplary embodiments, the Archpro method of calculating and constructing an arch is implemented through software run on any other compatible computing device. A device running the Archpro software would allow a user to access all or some of the features of a handheld Archpro Calculator, specifically allowing utilization of the system and method described herein for calculating coordinate pairs corresponding to the construction of an arch or archway.

BRIEF DESCRIPTION OF THE DRAWINGS

The accompanying drawings illustrate various exemplary embodiments of the present system and method and are a part of the specification. Together with the following description, the drawings demonstrate and explain the principles of the present system and method. The illustrated embodiments are examples of the present system and method and do not limit the scope thereof. Specifically, the illustrated exemplary embodiments of a physical computing device utilizing the system and method described herein may be fashioned any number of ways. Illustrated are two exemplary embodiments, while many more embodiments are contemplated and are possible.

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings. Throughout the drawings, identical reference numbers designate similar but not necessarily identical elements.

DETAILED DESCRIPTION

The present specification describes a system and method for drawing an arc on a material to be used to construct an arch. According to one exemplary embodiment, a desired arch height is input into a calculator along with a desired arch width, upon selecting the number of coordinates desired, the computing device outputs 'X' and 'Y-coordinates' that an operator uses to draw an arc corresponding exactly to the previously entered height and width of a desired arch. According to one exemplary embodiment, the computing device is a handheld device allowing a user to perform simple arithmetic calculations as well as calculating coordinates corresponding to an arch. According to another exemplary embodiment, the computing device is configured to access a program that may be installed and run on any number of devices including, a personal computer (PC), a cell phone, an electronic PDA, existing handheld calculators, or any other electronic device capable of running third party applications.

The computing device described herein uses a method for determining coordinates for drawing an arc on a material (e.g. plywood), allowing a builder to cut out the material along the arc and thereby construct an arch that is highly accurate to the originally specified arch. The described system and method will be hereafter referred to as the Archpro. Where the term Archpro may signify the physical device using the system and method described herein, a software emulation housed on a processor accessible memory component of a computing device of the system and method described herein, or the system and method alone. The Archpro accept inputs from a builder and quickly outputs coordinates the builder may use to construct the arch. As described above, custom arch construction is a difficult and tedious process, requiring much skill and experience. Using the Archpro allows a builder of little arch constructing experience to be able to quickly create an arch that is exact to specifications.

The present exemplary system and method used to create an arch using the Archpro are best described in conjunction with drawings. The drawings will facilitate in explaining the equations used to analyze the geometry of an arch, as well as how a builder may utilize the output coordinates to draw the arc and construct the arch.

In the following description, certain specific details are set forth in order to provide a thorough understanding of various embodiments of the present arch construction method. However, one skilled in the relevant art will recognize that the present exemplary system and method may be practiced without one or more of these specific details, or with other methods, components, materials, etc. In other instances, well-known construction methods associated with arch construction and construction in general are not described or shown in detail to avoid unnecessarily obscuring descriptions of the present exemplary system and method.

The term "arc," when used herein and in the appended claims shall be interpreted in the geometrical and mathematical sense signifying a portion of the circumference of a circle, or more specifically in mathematical terms: The length "s" of an arc of a circle of radius "r" and subtending a central angle of $\theta$ radians is $s=r\theta$; an arc therefore is a segment of a circle.

The term "arch" when used herein and in the appended claims shall be interpreted to be synonymous with archway (the space allowing one to pass beneath the arch) and shall be interpreted to be that of a construction generally in a curved shape as those generally constructed and known well to one skilled in the art of construction. Specifically an arch shall be interpreted to be a construction conforming to the shape of an arc, as defined above.

Unless the context requires otherwise, throughout the specification and claims which follow, the word "comprise" and variations thereof, such as, "comprises" and "comprising" are to be construed in an open, inclusive sense, that is as "including, but not limited to."

Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment. Furthermore, the particular features, structures, or characteristics may be combined in any suitable manner in one or more embodiments.

Figure 1:
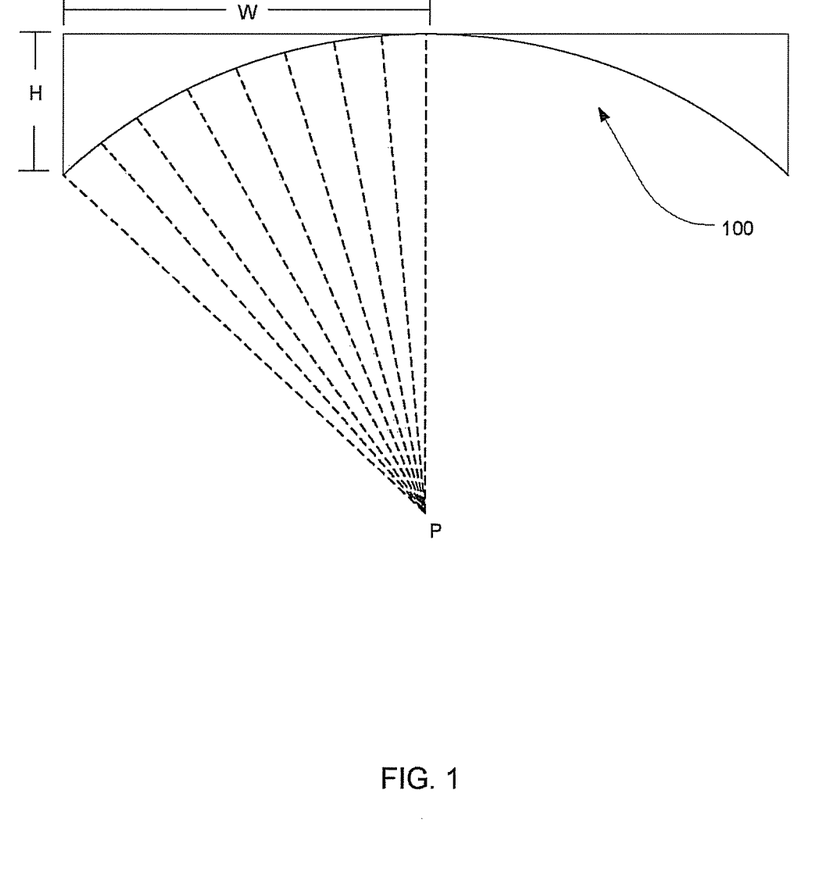
FIG. 1 is a top view of an arch and a center of a circle used to define the arch, according to one exemplary embodiment.

FIG. 1 shows an arch and a center of a circle corresponding to the drawn arch. To understand fully how an arc is a segment of a circle it is of note that the point labeled "P" in the drawing represents the center of a circle to which the segment labeled "100" belongs to. Thus, it is correct to say that the arc (100) is a segment of the circle formed with a center at point "P" and a radius defined by the dashed lines extending from "P" to the arc (100). As shown in the drawing, a label "H" shows the vertical height of the arc, and a label "W" shows a width of the arc. Note that the width (W) is not the width from one end of the arc to the other, but rather represents the width from one end of the arc to the center of the arc; of necessity the arc is symmetric. FIG. 1 shows radial lines extending from the center (P) to the arc (100) these lines are all the same length by the definition of a radius of a circle. The method described below utilized the height (H) and the width (W) to calculate points on the arc in reference to a predefined origin.

Utilizing a system and method incorporating a Cartesian Coordinate System requires that we define an origin, a starting point, by which we may reference any other point in a two dimensional plane. This is a standard method of identifying position and is recognizable to one skilled in the art. The origin may be assigned to any point; however, in reference to FIG. 2, subsequent figures, and the following description, the origin is defined as being the top left corner labeled with a "0". The origin (0) is the starting point used to reference coordinates.

Figure 2:
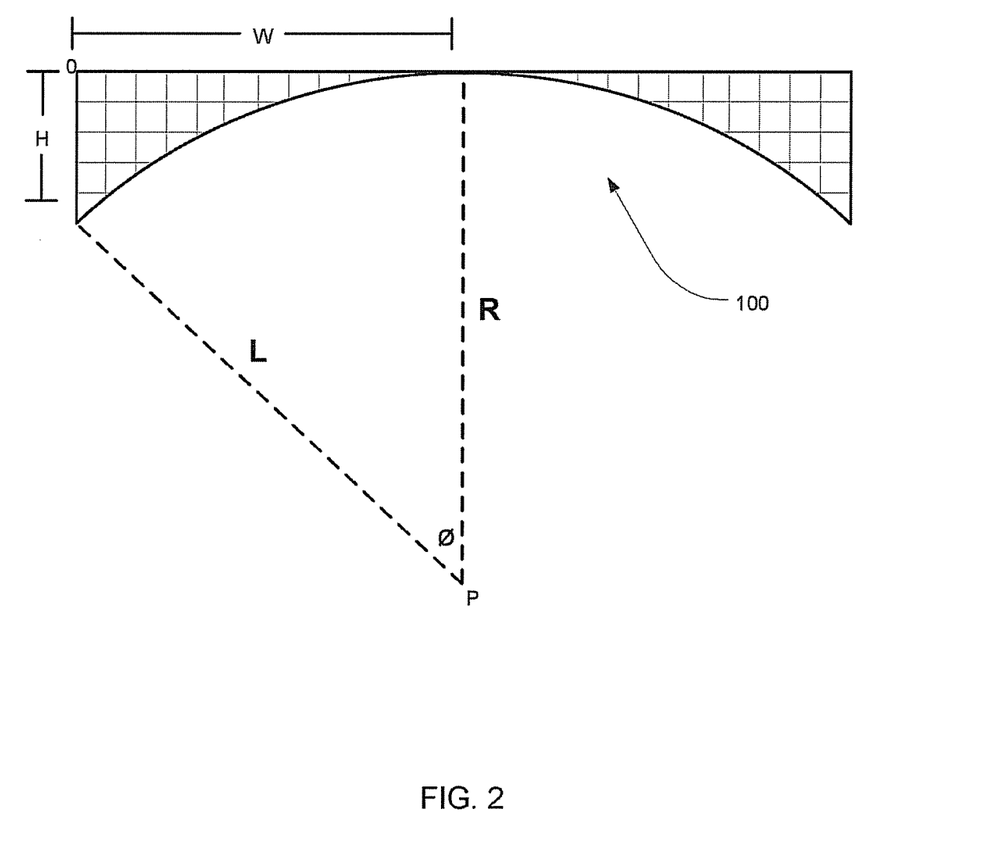
FIG. 2 is a geometric representation illustrating an arch, the center of the circle defining the arch, and a grid layout used to define points on the arc, according to one exemplary embodiment.

FIG. 2 clearly shows the origin (0) that will be used throughout the description as well as near the center (P) of the circle defining the arc (100) a "ø" may be seen, this symbol represents the angle defined by the intersection of lines "L" and "R". It should be noted that the line "L" intersects the arc on the one end and the line "R" intersects the arc at its midpoint. As the definition of an arc describes above, the arc has a length defined by length=R*2*ø, where ø is equal to half of θ (θ being equal to the angle subtended by the entire arc).

FIG. 2 also shows lines drawn in the figure that may be useful in visualizing coordinates defined by the Cartesian System with an origin at point "0". This coordinate system may be numbered as in FIG. 4B. A person using the method described herein may choose to label the material that will form the arch with a similar coordinate system, or may simply calculate the necessary points and only draw the arc not the coordinate plane. Further explanation in the use of the coordinate system will be provided below.

Figure 3:
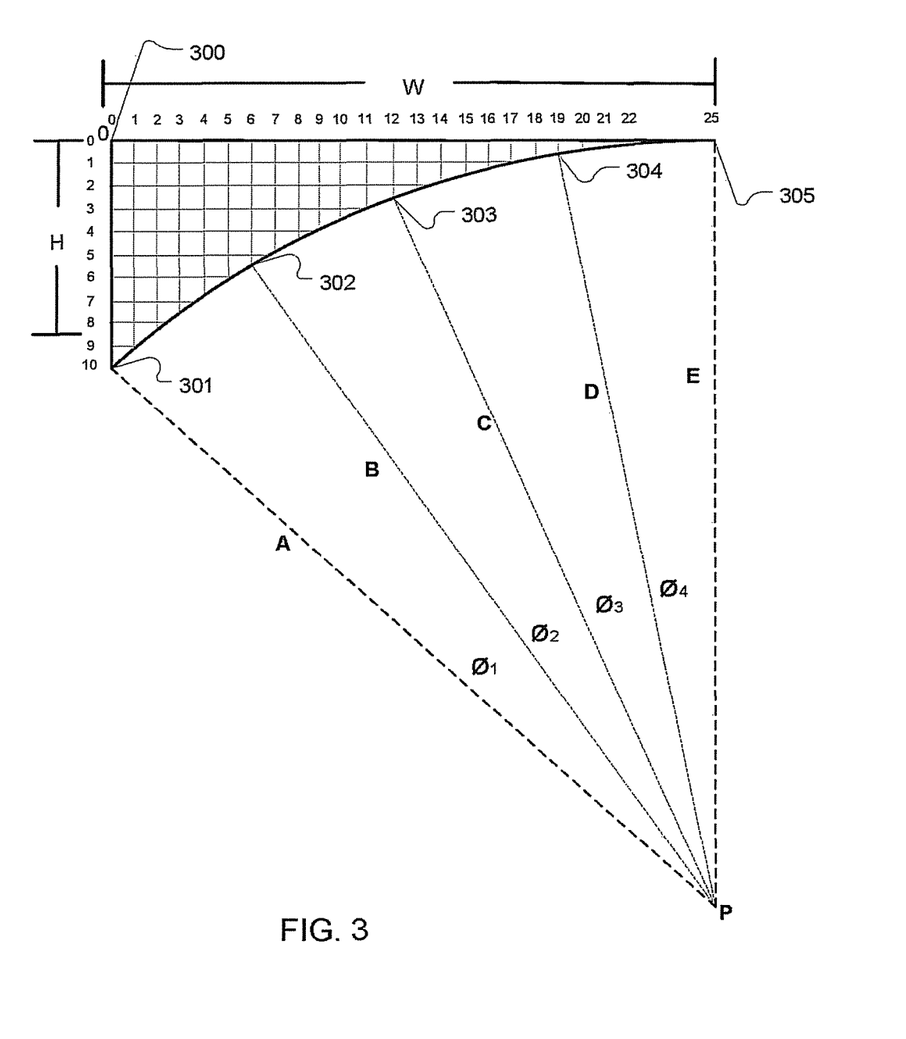
FIG. 3 is a geometric illustrating showing a portion of an arch, the defining center of a circle, radial lines used to calculate coordinate points, and a grid system associating coordinates to positions on the arc, according to one exemplary embodiment.

FIG. 3 shows an arc (100) similar to that of FIGS. 1 and 2. In this drawing the exemplary coordinate system is labeled with numbers beginning at the origin (0) and incrementing upward in either the X-direction (horizontal direction, or direction of the width (W)) or in the Y-direction (vertical direction, or direction of the height (H)). The angle defined in FIG. 2 as "ø" has been subdivided in FIG. 3 into equal portions of the original angle (ø). These subdivisions include ø1 defined by the intersection of line "A" and line "B", ø2 defined by the intersection of line "B" and line "C", ø3 defined by the intersection of line "C" and line "D", and finally ø4 defined by the intersection of line "D" and "E".

As can be seen in FIG. 3, the more the original angle ø (ø, FIG. 2) is divided the smaller the subsequent ø's are, and the more lines (A-E, FIG. 3) are used. Each line A-E represents a radial line drawn from the center (P) of the circle defined by the arc (100). Each line A-E intersects the arc (100) at a specific point on the coordinate system. It is essential that the method used to associate a point on the arc is in the coordinate system is understood, as the system and method for constructing an arc utilizes this information to allow a builder to easily construct an arch.

Line "A" intersects the arc at point (301) point (301) is labeled on the coordinate system as being {0, 10}, that is zero to the right from the origin (0) and ten down from the origin (0). The line "B" intersects the arc at point (302) and is labeled by the coordinate system as {6,5.5}, that is six to the right of the origin (0) and five-and-a-half down from the origin (0). This coordinate system is common and is known to one skilled in the art. For completion, the line "C" intersects at {12, 2.5}, the line "D" intersects at {19, 0.5}, and the line "E" intersects at {25, 0}.

With a drawing it is easy to associate the coordinates of the intersection of a line and the arc; however this may also be calculated using simple geometry as well. As described above, many builders currently use a method similar to this in that they take a center of a circle defined by a desired arc and attach a string to this point. By sweeping the free end of a string, the desired arc is formed. This method is impractical in building large arches or arches representing only a small degree of a large circle. Thus, the present exemplary system and method is a method a builder may use to calculate the coordinates of the arc without having to physically attach a string or even find the enter of the circle corresponding to the arc.

For the following description of the use of the present exemplary system and method the material used for constructing the arch described is plywood; however, it is to be understood that the system and method can be applied to any material desired.

Figure 4A:
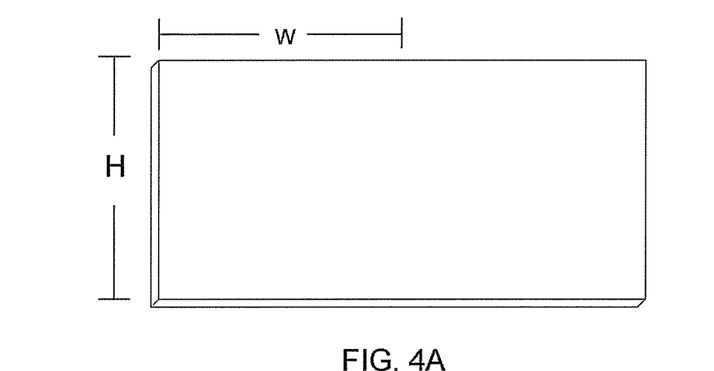
FIGS. 4A-4C show steps in a process used to create an arch using the system and method described herein, according to one exemplary embodiment.

FIG. 4A shows a piece of plywood. The plywood is labeled with a width (W) of the desired arch and a height (H) of the desired arch. A builder may utilize a computing device incorporating the present exemplary system and method to construct the desired arch. The computing device, according to one embodiment, is a handheld device including a memory component including instructions to perform the present exemplary method, a processor configured to communicably access the memory component and the instructions thereon to generate a GUI or coordinates instructive in constructing an arch. According to one exemplary embodiment, when the processor accesses the arch building instructions on the memory component, the computing device prompts a user, via a GUI (illustrated in FIG. 8A), for a desired arch height (H) and width (W). The user is then prompted for the number of points on the Cartesian Coordinate System desired. According to the exemplary embodiment illustrated in FIG. 4B, the number of points given is 14. The 14 points provided to the user are in addition to the end points {0, H} and {W, 0}. Consequently, the user has a total of 16 total points to use in constructing the desired arch. According to various exemplary embodiments, the user may request more or less points on the coordinate system corresponding to the size of the desired arch. A default number may also be incorporated into the design of present exemplary system.

Figure 4B:
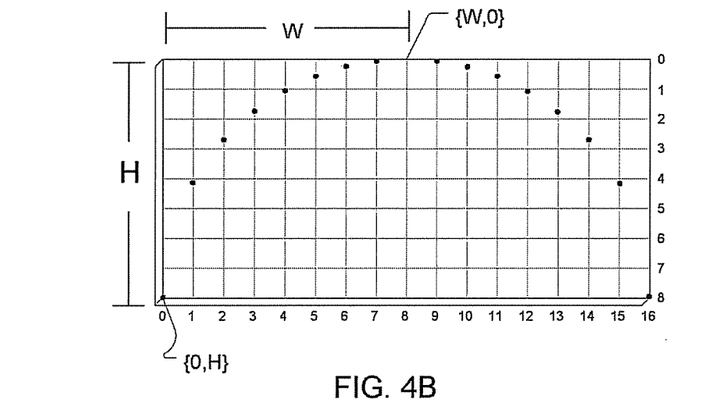
Figure 4C:
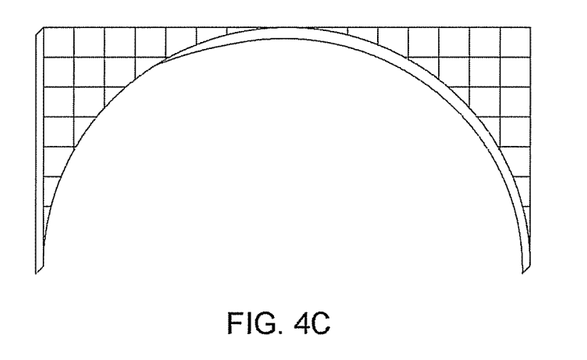

According to one exemplary embodiment, the present exemplary system outputs the pairs of coordinates in a graphically illustrated table. According to an alternative embodiment, the Archpro outputs each pair one after the other, as prompted by the user in a computing device such as a calculator. Upon receiving the coordinates, dots or marks may be drawn on the plywood, as shown in FIG. 4B corresponding to the coordinate pairs graphically received by the system. Once the coordinates or dots are placed on the building medium, such as plywood, the builder may cut out the plywood in the form of an arc by following the dots. After cutting out the desired arc, an arch may be formed following the shape of the cut plywood. The plywood may be a component of the actual arch or it may serve as a guide in the construction of the actual arch. The finished arch appears according to FIG. 4C, according to one exemplary embodiment.

According to one embodiment, the present exemplary computing device uses the inputs of height (H) and width (W) to generate any desired number of coordinate points corresponding to the arc. Described below is a method, according to one exemplary embodiment, that the Archpro may utilize in determining these coordinates, FIG. 3 may be useful in visualizing this process.

With a height "H" and a width "W", the computing device accesses instructions to use the following equation to determine the radius "R":

$$R=(W^2+H^2)/2*H$$

With this equation we are given a value of "R", the radius of the base circle. Using this information we can identify the computational center of the circle "P"; any two lines of length "R" with one endpoint of each line touching the arc, where the other two endpoints intersect is the center "P" of the circle.

An angle "ø", as shown in FIG. 2, may then be calculated by the equation:

$$ø=\sin^{-1}(W/R)$$

With an angle "ø", the present exemplary system utilizes the number of coordinate points desired to divide the angle "ø" into sections. In FIG. 1 the angle "ø" is divided into 8 sections, in FIG. 3 the angle "ø" is divided into 4 sections. For simplicity we will continue using FIG. 3.

The angle is divided into four sections using five lines: A, B, C, D, E. Each line intersects at a point on the arc. Line "A" intersects at point (301), line "B" at point (302), "C" at (303), "D" at (304), and "E" at (305). The coordinates {X,Y} that correspond to these intersections may be calculated as follows:

$$X=W-R*\sin(ø_n)\ Y=R-R*\cos(ø_n)$$

Where for each point the "$ø_n$" represents the total angle between a line and the line "E". For example using FIG. 3: for the point (304) corresponding to line "D", $ø_n$ is equal $ø_4$; for the point (303) corresponding to line "C", $ø_n=ø_4+ø_3$; for the point (302) corresponding to line "B", $ø_n=ø_4+ø_3+ø_2$.

Using these equations, or variations of them, the present exemplary system and method accepts three inputs: width (W), height (H), and desired number of points, and is able to output a series of {X,Y} coordinates corresponding to the desired arc. A builder is then able to utilize this information to construct an arch in a manner known to those skilled in the art.

Exemplary Structure

Figure 5:
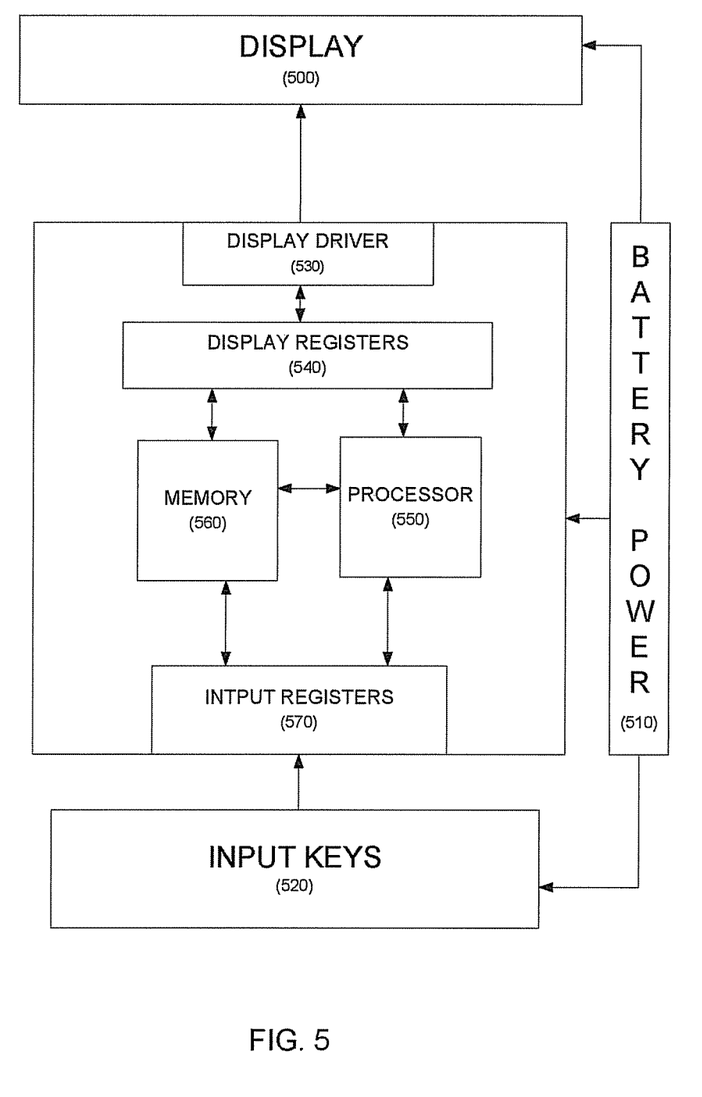
FIG. 5 is a block diagram illustrating a computing device configured to incorporate the methods described herein to construct an arch, according to one exemplary embodiment.

FIG. 5 is one exemplary embodiment of a block diagram of the internal components of computing device configured to incorporate the present exemplary system and method to provide a user with arc coordinates. According to this exemplary embodiment, as can be seen in FIG. 5, the exemplary computing device is battery powered (510). Alternative embodiments may include power adapters for common wall outlets, solar cells, or other methods commonly used to power electronic devices.

According to one exemplary embodiment, the exemplary computing device comprises of an input keyboard (520) or other input mechanism that sends signals to input registers (570). These input registers store the keys as they are pressed and may provide some feedback to the user. According to one exemplary embodiment, a microprocessor (550) may use the keys that are pressed and store and extract information from memory (560). The memory may be comprised of SRAM (static random access memory) and/or DRAM (dynamic random access memory), it may be a volatile memory or a non-volatile memory. In fact, the memory may be of any type of memory commonly used in the art. The processor sends output to display registers (540), which are read by a display driver (530). The display driver (530) sends signals to a display (500), where a user may read the display.

According to one exemplary embodiment, a user may begin a program on the computing device, such as Archpro Calculator, the processor (550) would recognize that the program was initiated by the user. The display (500) would immediately prompt the user for a width and specify in which units this should be input. By pressing the input keys (520) the user could input the information and then press enter, this information would be stored by the processor (550) in memory (560). The user would then be prompted on the display (500) to input the desired arc height, upon the user entering the values in through the keys (520), the processor (550) would store this information in the memory (560). The user would then be prompted for the desired number of coordinate pairs. After this is entered the processor (550) would retrieve the information previously stored in memory (560) and, according to the instructions stored in the memory (560) compute the desired number of coordinate pairs.

According to one exemplary embodiment, the generated multiple coordinate pairs are displayed on the screen at a single time in a table or graphical representation of their relative position. Alternatively, according to one exemplary embodiment, only one pair is displayed on the screen at a time. In either embodiment, the user is able to retrieve the coordinate pairs desired to construct the arch.

Figure 6:
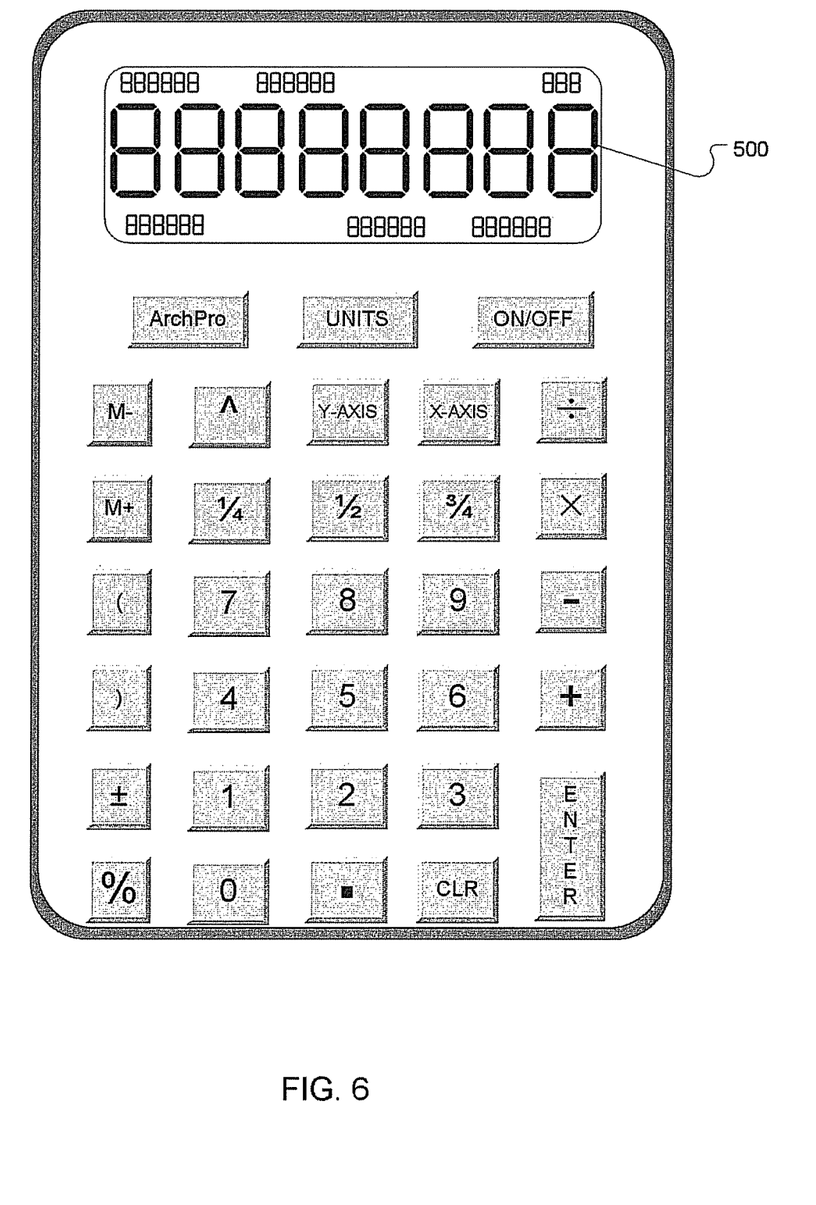
FIG. 6 is a front view of a computing device configured to provide detail used in constructing an arch using the methods described herein, according ton one exemplary embodiment.

FIG. 6 is an exemplary illustration of a calculator incorporating the present exemplary system and method, according to one exemplary embodiment. This figure is intended to demonstrate details of the calculator, not to limit or define features of the calculator. In this example, the display is a seven-segment liquid crystal display (LCD), the Archpro may utilize any number of display technologies known in the art. The display (500) is shown here with only one line of primary information, according to this embodiment. As can be seen in FIG. 6, the exemplary calculator may also be configured to include and perform several math functions common to traditional handheld calculators such as addition, subtraction, division, sin, cos, tan, inverses, exponential functions, percent. It may also include several features that are useful in construction, such as unit conversion, volume calculation, graphing, memory functions, quick access fractions, or other features as are desired.

Figure 7:
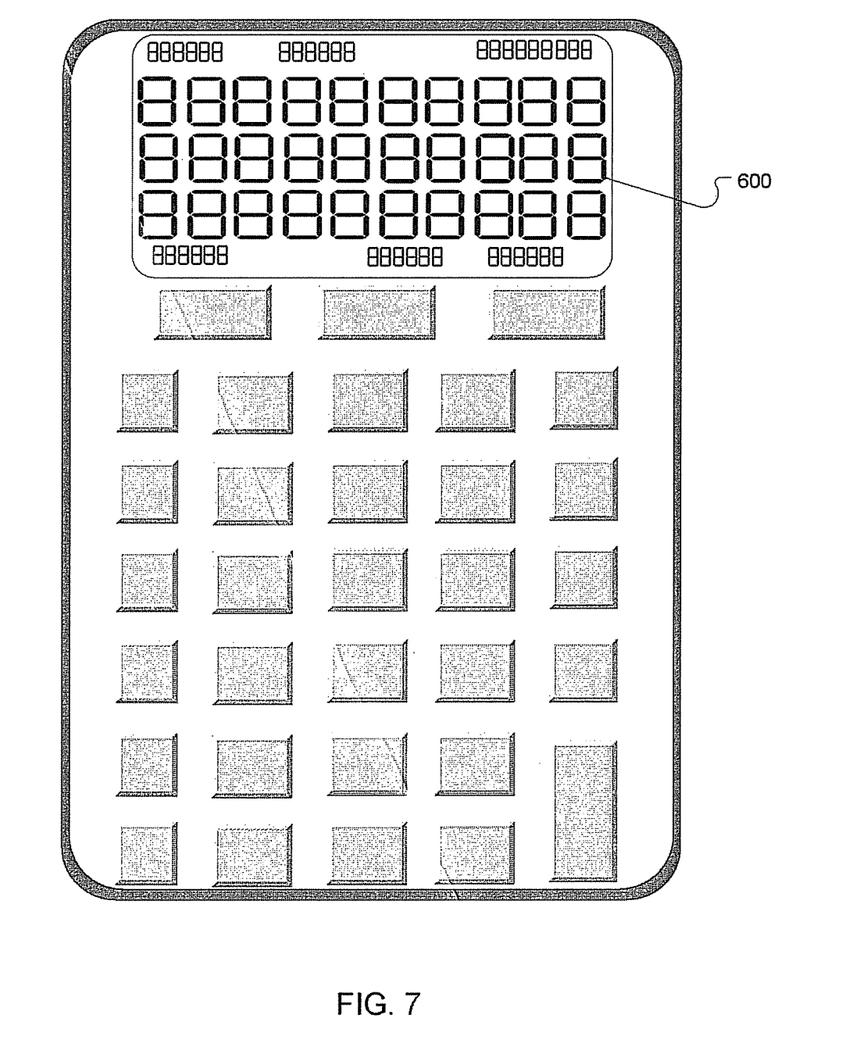
FIG. 7 is a front view of an alternative computing device configured to provide detail used in constructing an arch using the methods described herein, according ton one exemplary embodiment.

FIG. 7 is an exemplary calculator configured to perform the present exemplary method according to another exemplary embodiment. FIG. 7 is also intended to be nothing more than an example and is not intended to limit the dimensions or features of the computing device, as it may include various shapes and features not shown in either FIG. 6 or 7. This exemplary embodiment shows an example of a display having multiple lines. This may allow for expanded capabilities of graphing or illustrating tables and point locations. After running the above-mentioned arc defining calculations, the illustrated multiple line display may be useful in viewing many coordinate pairs at once, allowing a builder to quickly read the pairs and construct the arc necessary to accurately form the desired arch.

Figure 8A:
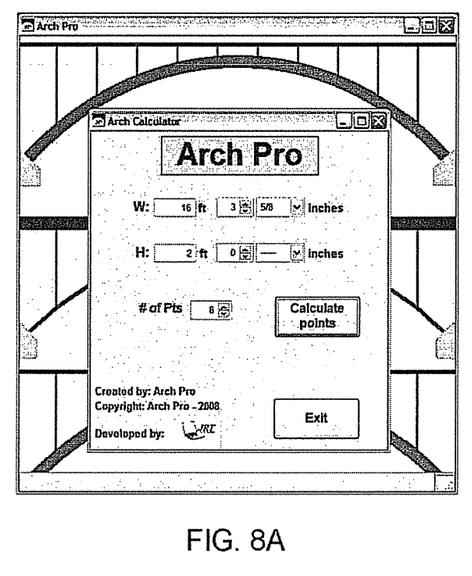
FIGS. 8A and 8B are illustrations of a graphical user interface (GUI) generated by a computing device incorporating the systems and methods described herein, according to one exemplary embodiment.
Figure 8B:
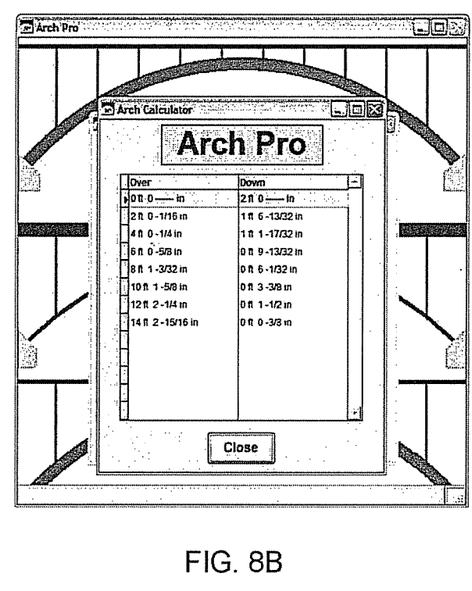

As previously mentioned in the specification, the present computing device is not limited to being a handheld device. The same calculations may be done using a software emulator version on a laptop computer or other computing device. In this exemplary embodiment, a user would load a program including instructions for performing the present exemplary method onto a computing device that allows third party applications such as a cell phone, PDA, laptop, desktop, programmable calculator, or any other electronic device falling into this category. After loading the program, a user may run the program and have access to all or some of the features described above in reference to the handheld version of the present system and method. FIGS. 8A and 8B show exemplary screen shots of possible GUIs a user may see when running the Archpro software on another device.

FIG. 8A shows that a window may appear requesting information in regards to the height, width, and number of points. As shown the values are requested in feet and inches, this is according to one exemplary embodiment. Another embodiment may allow this to be modified or may be preset to different units. FIG. 8B shows a table listing resultant X and Y coordinates, labeled in this screen shot as a number of feet and inches "over" and the number of feet and inches "down".

Figure 9:
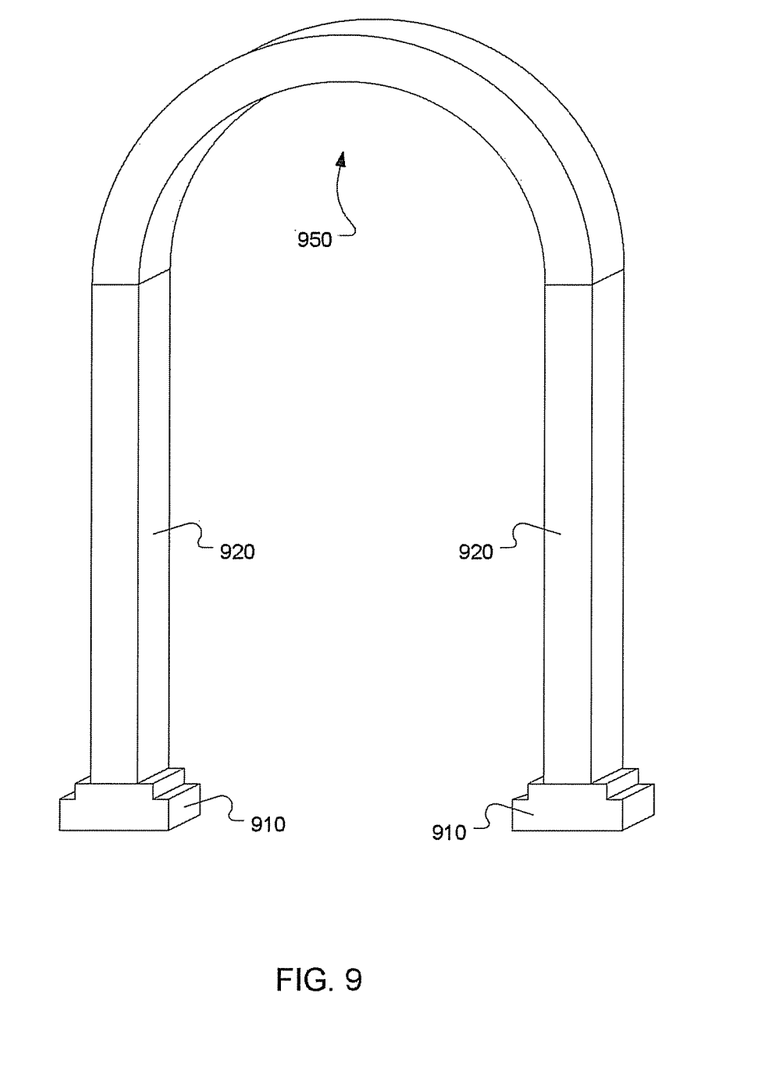
FIG. 9 is a block diagram illustrating an example of an archway constructed using the system and method described herein, according to one exemplary embodiment.

FIG. 9 is an arch that may be built utilizing the present exemplary system and method, either with a handheld computing device or a software version. The arch (950) is constructed using the methods described above and then placed on two pillars (920) which are secured by two bases (910).

The preceding description has been presented only to illustrate and describe the present method and system. It is not intended to be exhaustive or to limit the present system and method to any precise form disclosed. Many modifications and variations are possible in light of the above teaching.

The foregoing embodiments were chosen and described in order to illustrate principles of the system and method as well as some practical applications. The preceding description enables others skilled in the art to utilize the method and system in various embodiments and with various modifications as are suited to the particular use contemplated. It is intended that the scope of the present exemplary system and method be defined by the following claims.

What is claimed is:

1. A handheld device used for constructing arches comprising:
   a power source;
   a memory component including instructions for generating a plurality of arc defining coordinate pairs;
   a processor configured to access said instructions and generate a graphical representation of said arc defining pairs;
   a display configured to visually display said graphical representation of said arc defining pairs; and a plurality of keys or button for entering alphanumeric characters to said processor;
   wherein said instructions for generating arc defining coordinate pairs are configured to prompt a user for a desired arc width and a height corresponding to a desired arch and use said desired arc width and height to generate said graphical representation of said arc defining pairs corresponding to said desired arch;
   wherein said instructions further comprise; instructions which, when accessed by said processor, generate a user interface prompting a user to enter a desired width dimension of a desired arch; instructions which, when accessed by said processor, incorporate said desired width dimension and said desired height dimension to generate coordinate pairs corresponding to a coordinate system, wherein said coordinate pairs correspond to points defining an arc, said arc corresponding to said width and height dimensions of said desired arch; and
   wherein said coordinate pairs are given according to a standard Cartesian Coordinate System.

2. The handheld device of claim 1, wherein said coordinate pairs are given in a height value and a width value corresponding to the vertical and horizontal axis on said standard Cartesian Coordinate System.

3. The handheld device of claim 2, wherein said instructions further comprise;
   instructions which, when accessed by said processor, generate a user interface prompting said user to input a desired number of said coordinate pairs.

4. The handheld device of claim 1, wherein said graphical representation of said arc defining pairs corresponding to said desired arch comprise a table labeled with vertical values labeled as "down" and horizontal values labeled as "over".

5. The handheld device of claim 1, wherein said graphical representation of said arc defining pairs corresponding to said desired arch comprise a graphical illustration of said arc defining pairs illustrated on a graphically generated arc.

6. The handheld device of claim 1, wherein said graphical representation of said arc defining pairs corresponding to said desired arch comprise individually displaying said arc defining pairs one at a time progressing across a horizontal axis of said arc.

7. The handheld device of claim 3, wherein said processor and said memory are configured to accept said desired height and width values corresponding to a desired arch, process said values, and output coordinate pairs corresponding to said desired arch to said display.

8. The handheld device of claim 7, wherein said processor and said memory are configured to perform a plurality of known mathematical functions initiated by pressing keys or buttons belonging to said plurality of keys or buttons, including addition, subtraction, multiplication, division, Sin, Cos, Tan, inverses, and exponentials.

9. The handheld device of claim 8, wherein said processor and said memory are capable of performing a plurality of unit conversion and dimensional calculations initiated by pressing keys or buttons belonging to said plurality of keys or buttons, including yards, feet, inches, meters, centimeters, millimeters, areas, and volumes.

10. The handheld device of claim 1, wherein said display is large enough to display the output of said program as a table having at least two columns specifying the coordinates of said arc.

11. A device for constructing arches, comprising:
    a power source;
    a memory component including instructions for generating a plurality of arc defining coordinate pairs;
    a processor configured to access said instructions and generate a graphical representation of said arc defining pairs;
    a display configured to visually display said graphical representation of said arc defining pairs; and
    a plurality of keys or button for entering alphanumeric characters to said processor;
    wherein said instructions for generating arc defining coordinate pairs are configured to prompt a user for a desired arc width and a height corresponding to a desired arch and use said desired arc width and height to generate said graphical representation of said arc defining pairs corresponding to said desired arch; and
    wherein said graphical representation of said arc defining pairs corresponding to said desired arch include one of a table labeled with vertical values labeled as "down" and horizontal values labeled as "over", a graphical illustration of said arc defining pairs illustrated on a graphically generated arc, or individually displaying said arc defining pairs one at a time progressing across a horizontal axis of said arc.

12. The device of claim 11, wherein said instructions further comprise;
  instructions which, when accessed by said processor, generate a user interface prompting a user to enter a desired width dimension of a desired arch;
  instructions which, when accessed by said processor, generate a user interface prompting a user to enter a desired height dimension of said desired arch; and
  instructions which, when accessed by said processor, incorporate said desired width dimension and said desired height dimension to generate coordinate pairs corresponding to a coordinate system, wherein said coordinate pairs correspond to points defining an arc, said arc corresponding to said width and height dimensions of said desired arch.

13. The device of claim 12, wherein said coordinate pairs are given according to a standard Cartesian Coordinate System.

14. The device of claim 13, wherein said coordinate pairs are given in a height value and a width value corresponding to the vertical and horizontal axis on said standard Cartesian Coordinate System.

15. The device of claim 14, wherein said instructions further comprise:
  instructions which, when accessed by said processor, generate a user interface prompting said user to input a desired number of said coordinate pairs.

16. The handheld device of claim 15, wherein said processor and said memory are configured to accept said desired height and width values corresponding to a desired arch, process said values, and output coordinate pairs corresponding to said desired arch to said display.

17. The handheld device of claim 16, wherein said processor and said memory are configured to:
  perform a plurality of known mathematical functions initiated by pressing keys or buttons belonging to said plurality of keys or buttons, including addition, subtraction, multiplication, division, Sin, Cos, Tan, inverses, and exponentials; and
  perform a plurality of unit conversion and dimensional calculations initiated by pressing keys or buttons belonging to said plurality of keys or buttons, including yards, feet, inches, meters, centimeters, millimeters, areas, and volumes.

* * * * *